US011966333B1

(12) United States Patent
Kousha et al.

(10) Patent No.: US 11,966,333 B1
(45) Date of Patent: Apr. 23, 2024

(54) AUTOMATED PREDICTIVE CACHING OF CLOUD-SOURCED DATA AND METHODS OF USE THEREOF

(71) Applicant: Capital One Services, LLC, McLean, VA (US)

(72) Inventors: Shabnam Kousha, Washington, DC (US); Lin Ni Lisa Cheng, Great Neck, NY (US); Asher Smith-Rose, Midlothian, VA (US); Joshua Edwards, Philadelphia, PA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 25 days.

(21) Appl. No.: 17/966,666

(22) Filed: Oct. 14, 2022

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
CPC .. G06F 12/0802; G06F 2212/60; G06F 17/18; G06F 30/27; G06F 40/20; G06F 12/084
USPC ....................................................... 711/118
See application file for complete search history.

(56) References Cited

U.S. PATENT DOCUMENTS

| | | | |
|---|---|---|---|
| 10,810,528 B1 * | 10/2020 | Phillips | G06N 20/00 |
| 2002/0137497 A1 | 9/2002 | Gillsepie | |
| 2011/0213800 A1 | 9/2011 | Saros et al. | |
| 2011/0258049 A1 | 10/2011 | Ramer et al. | |
| 2021/0019676 A1 * | 1/2021 | Phillips | G06Q 10/06314 |
| 2022/0391793 A1 * | 12/2022 | Latimer | G06F 40/20 |

* cited by examiner

*Primary Examiner* — Hashem Farrokh
(74) *Attorney, Agent, or Firm* — Greenberg Traurig, LLP

(57) ABSTRACT

Systems and methods of the present disclosure enable intelligent dynamic caching of data by accessing an activity history of historical electronic activity data entries associated with a user account, and utilizing a trained entity relevancy machine learning model to predict a degree of relevance of each entity associated with the historical electronic activity data entries in the activity history based at least in part on model parameters and activity attributes of each electronic activity data entry. A set of relevant entities are determined based at least in part on the degree of relevance of each entity. Pre-cached entities are identified based on pre-cached entity data records cached on the user device, and un-cached relevant entities from the set of relevant entities are identified based on the pre-cached entities. The cache on the user device is updated to cache the un-cached entity data records associated with the un-cached relevant entities.

20 Claims, 7 Drawing Sheets

AUTOMATED PREDICTIVE CACHING OF CLOUD-SOURCED DATA AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Service, LLC, All Rights Reserved.

FIELD OF TECHNOLOGY

The present disclosure generally relates to computer-based systems configured for automated predictive caching of cloud-sourced data, including predictive caching of caller identification data on a user device.

BACKGROUND OF TECHNOLOGY

Caller identification has become an increasingly important feature of telephony services. Caller identification provides assurances and trust of who is calling in order to avoid spam calls, phishing calls, telemarketers, and other unwanted callers.

Additionally, user devices have finite storage and/or memory to store data. Accessing online data may be unreliable due to inconsistent network connections. Thus, maintaining local data increases demands on the storage and/or memory while accessing the data via a network connection may be unreliable.

SUMMARY OF DESCRIBED SUBJECT MATTER

In some embodiments, the present disclosure provides a technically improved method for dynamically and predictively caching data locally to a user device to maximize storage and network efficiencies. The method includes at least the following steps of receiving, by at least one processor, an entity data update instruction associated with a user device; where the entity data update instruction includes at least one identifier associated with the user device; determining, by the at least one processor, a user account associated with the user device based at least in part on the at least one identifier; accessing, by the at least one processor, an activity history associated with the user account; where the activity history includes a plurality of historical electronic activity data entries; where each electronic activity data entry of the plurality of historical electronic activity data entries includes a plurality of activity attributes including: a date attribute indicating a date of each electronic activity data entry, a location attribute indicating a location of each electronic activity data entry and an entity attribute indicating an entity associated with each electronic activity data entry; utilizing, by the at least one processor, at least one trained entity relevancy machine learning model to predict a degree of relevance of each entity associated with the plurality of historical electronic activity data entries in the activity history based at least in part on a plurality of model parameters and the plurality of activity attributes of each electronic activity data entry; determining, by the at least one processor, a set of relevant entities based at least in part on the degree of relevance of each entity; determining, by the at least one processor, at least one pre-cached entity associated with the user device; where the at least one pre-cached entity includes at least one pre-cached entity data record associated with at least one entity, the at least one pre-cached entity data record being stored in a cache on the user device; determining, by the at least one processor, at least one un-cached relevant entity in the set of relevant entities based at least in part on the at least one pre-cached entity; and updating, by the at least one processor, the cache on the user device with at least one un-cached entity data record associated with the at least one un-cached relevant entity.

In some embodiments, the present disclosure provides a technically improved system for dynamically and predictively caching data locally to a user device to maximize storage and network efficiencies. The system includes at least the following components of at least one processor configured to execute software instructions. The software instructions cause the at least one processor to perform steps to: receive an entity data update instruction associated with a user device; where the entity data update instruction includes at least one identifier associated with the user device; determine a user account associated with the user device based at least in part on the at least one identifier; access an activity history associated with the user account; where the activity history includes a plurality of historical electronic activity data entries; where each electronic activity data entry of the plurality of historical electronic activity data entries includes a plurality of activity attributes including: a date attribute indicating a date of each electronic activity data entry, a location attribute indicating a location of each electronic activity data entry and an entity attribute indicating an entity associated with each electronic activity data entry; utilize at least one trained entity relevancy machine learning model to predict a degree of relevance of each entity associated with the plurality of historical electronic activity data entries in the activity history based at least in part on a plurality of model parameters and the plurality of activity attributes of each electronic activity data entry; determine a set of relevant entities based at least in part on the degree of relevance of each entity; determine at least one pre-cached entity associated with the user device; where the at least one pre-cached entity includes at least one pre-cached entity data record associated with at least one entity, the at least one pre-cached entity data record being stored in a cache on the user device; determine at least one un-cached relevant entity in the set of relevant entities based at least in part on the at least one pre-cached entity; and update the cache on the user device with at least one un-cached entity data record associated with the at least one un-cached relevant entity.

In some embodiments, the present disclosure further provides technically improved systems and/or methods further including determining, by the at least one processor, a memory size associated with the cache; determining, by the at least one processor, a number of entity data records that can be stored in the cache based on the memory size; and determining, by the at least one processor, the set of relevant entities based at least in part on the number of entity data records that can be stored in the cache.

In some embodiments, the present disclosure further provides technically improved systems and/or methods further including: determining, by the at least one processor, at least one travel plan based at least in part on the plurality of historical electronic activity data entries; and utilizing, by the at least one processor, the at least one trained entity relevancy machine learning model to predict the degree of relevance of each entity associated with the plurality of historical electronic activity data entries in the activity history based at least in part on the at least one travel plan, the plurality of model parameters and the plurality of activity attributes of each electronic activity data entry.

In some embodiments, the present disclosure further provides technically improved systems and/or methods further including receiving, by the at least one processor, at least one feedback from the user device; where the at least one feedback includes at least one indication of use of at least one used entity data record in the cache; and training, by the at least one processor, the at least one trained entity relevancy machine learning model based at least in part on the at least one feedback.

In some embodiments, the present disclosure further provides technically improved systems and/or methods further including where the at least one pre-cached entity data record includes entity identification data for communications received from at least one entity associated with the at least one entity data record by a communication application on the user device.

In some embodiments, the present disclosure further provides technically improved systems and/or methods further including where the communication application includes a telephone application, and the entity identification data includes caller identification information.

In some embodiments, the present disclosure further provides technically improved systems and/or methods further including: determining, by the at least one processor, at least one pre-cached non-relevant entity based at least in part on the set of relevant entities and the at least one pre-cached entity; generating, by the at least one processor, at least one entity data record removal instruction configured to cause the user device to remove the at least one pre-cached non-relevant entity; and instructing, by the at least one processor, with the at least one entity data record removal instruction, by the at least one processor, the user device to remove the at least one pre-cached non-relevant entity from the cache.

In some embodiments, the present disclosure further provides technically improved systems and/or methods further including generating, by the at least one processor, at least one entity data record cache instruction configured to cause the user device to store the at least one un-cached relevant entity; and instructing, by the at least one processor, the user device to update the cache by adding the at least one un-cached relevant entity to the cache.

In some embodiments, the present disclosure further provides technically improved systems and/or methods further including where the at least one trained entity relevancy machine learning model includes a classification layer configured to output at least one probability value representative of at least one probability of relevance.

In some embodiments, the present disclosure further provides technically improved systems and/or methods further including where the plurality of historical electronic activity data entries include a plurality of historical transactions.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
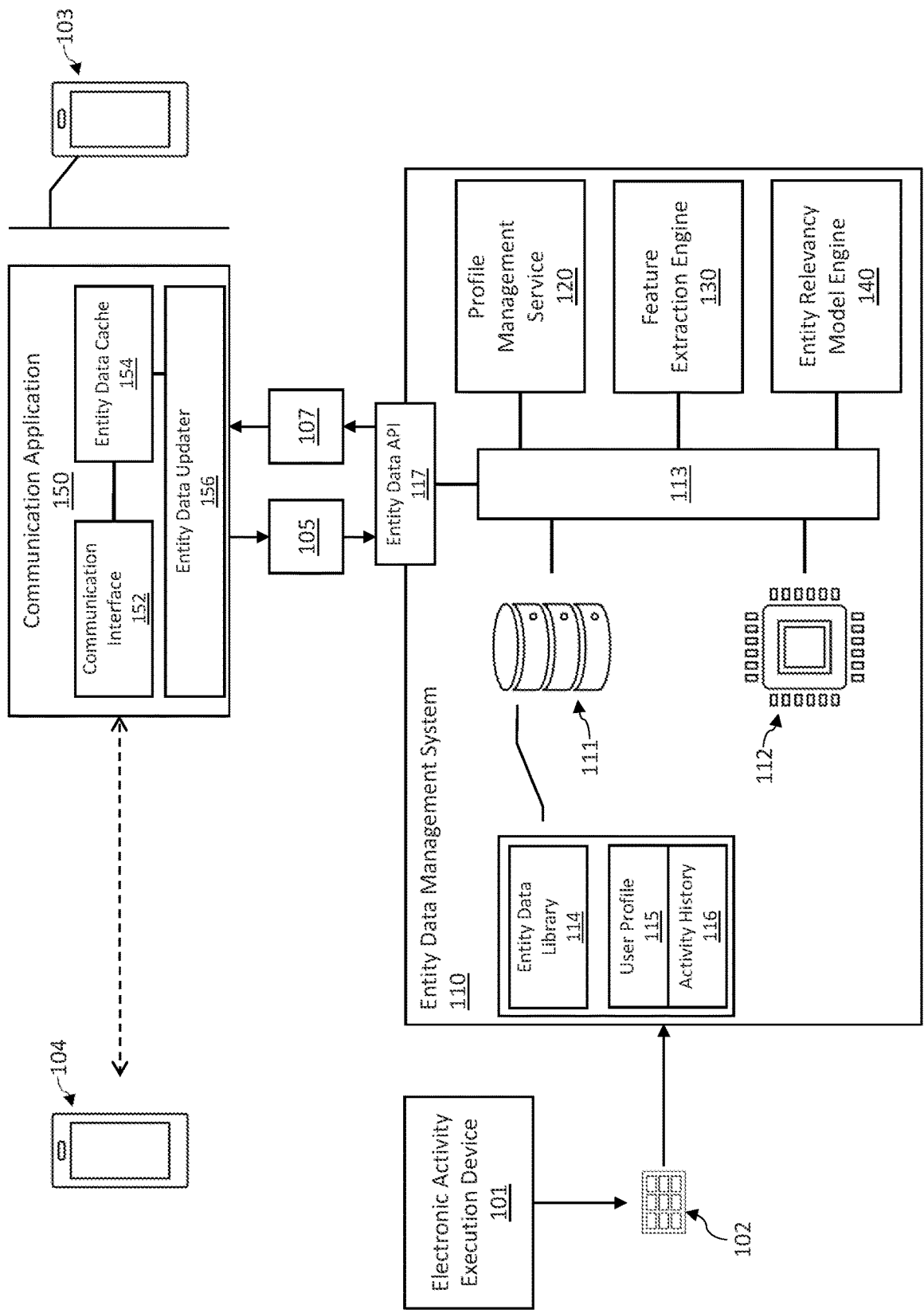
FIG. 1 is a block diagram of a system/platform for predictive retrieval and caching of relevant entity data on a user device in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 7 illustrate systems and methods of predictive data caching on a user device based on a user profile history. The following embodiments provide technical solutions and technical improvements that overcome technical problems, drawbacks and/or deficiencies in the technical fields involving computational resource inefficiencies resulting in local storage of entity data for identification during communications, and slow remote delivery of the entity data at the time of the communication as the typical solution to the inefficiencies of local storage of the entity data. As explained in more detail, below, technical solutions and technical improvements herein include aspects of improved data use prediction using machine learning techniques and a user profile history for more efficient retrieval and caching of data via intelligent machine learning-based predictive pre-caching of communication data based on historical activity records associated with a user profile. Based on such technical features, further technical benefits become available to users and operators of these systems and methods. Moreover, various practical applications of the disclosed technology are also described, which provide further practical benefits to users and operators that are also new and useful improvements in the art.

Figure 2:
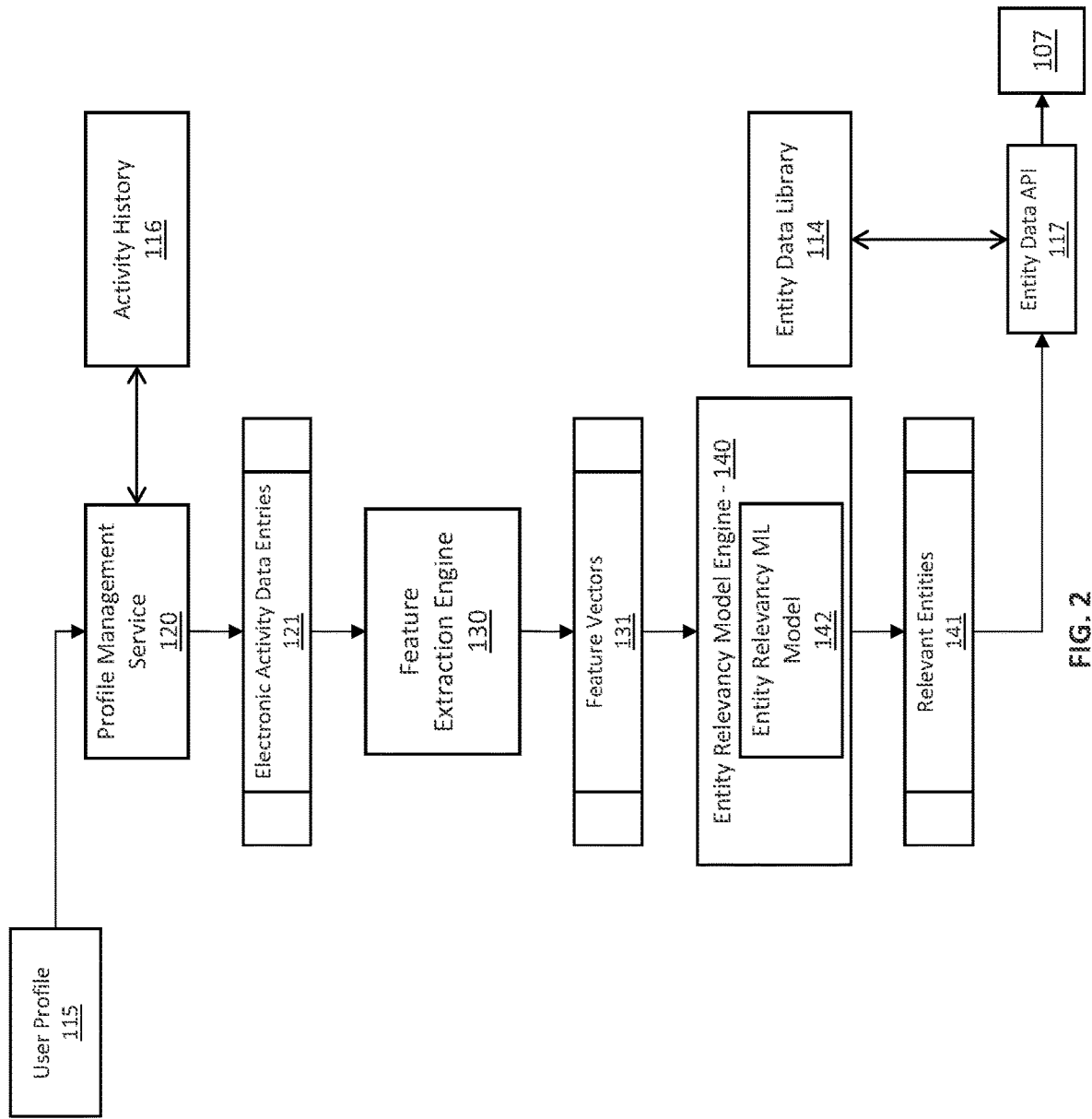
FIG. 2 is a flow chart of a system/platform for predictive retrieval and caching of relevant entity data on a user device in accordance with one or more embodiments of the present disclosure.

FIG. 1 is a block diagram of a system/platform for predictive retrieval and caching of relevant entity data on a user device in accordance with one or more embodiments of the present disclosure. FIG. 2 is a flow chart of a system/platform for predictive retrieval and caching of relevant entity data on a user device in accordance with one or more embodiments of the present disclosure.

In some embodiments, a user device 103 may include a communication application 150 for sending and/or receiving communications over a communications network with other entities. In some embodiments, the communication application 150

In some embodiments, a user of the user device 103 may interact with a communication interface 152 to send and/or receive the communications with another device 104 of another entity over a communication network. In some embodiments, the entity may include, e.g., another user, organization, company, service, etc. In some embodiments, the communication interface 152 may include a graphical user interface (GUI), including, e.g., view data associated with an entity of the other device 104 such as identifying information including, e.g., a device identifier, an entity identifier, a name, a network address (e.g., IP address, telephone number, email address, social media handle, etc.) among other data or any combination thereof.

In some embodiments, the communication network may include a suitable network for sending and/or receiving digital and/or analog information. For example, the communication network may include, e.g., a public switched telephone network (PTSN), an integrated services digital network (ISDN), a private branch exchange (PBX), a wireless and/or cellular telephone network, a computer network including a local-area network (LAN), a wide-area network (WAN) or other suitable computer network, or any other suitable network or any combination thereof. In some embodiments, a LAN may connect computers and peripheral devices in a physical area by means of links (wires, Ethernet cables, fiber optics, wireless such as Wi-Fi, etc.) that transmit data. In some embodiments, a LAN may include two or more personal computers, printers, and high-capacity disk-storage devices, file servers, or other devices or any combination thereof. LAN operating system software, which interprets input and instructs networked devices, may enable communication between devices to share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, cellular data networks, or other wide-area connection means. In some embodiments, an example of a WAN may include the Internet.

In some embodiments, communications from the other device 104 may include metadata having an endpoint identifier that identifies an endpoint (e.g., the source and/or recipient) of communications, such as, e.g., the device identifier and/or the network address associated with the other device 104. Such endpoint identifier may identify the other device 104 for the purposes of electronic communication but may not be recognizable to the user of the user device 103 and/or may not identify the entity associated with the entity device 104. Thus, a mapping of the endpoint identifier to an entity identifier identifying the entity may enable alerting the user to the origin of communications received from the other device 104, for example, by display of the entity identifier via the communication interface 152.

In some embodiments, mapping endpoint identifiers to entity identifiers for every other communication endpoint (e.g., device, network address, location, etc.) may result in thousands, tens of thousands, hundreds of thousands, millions or more records. All of these records may result in a memory footprint that is too large to be stored on the user device 103. Thus, in some embodiments, an entity data management system 110 may maintain an entity data library 114 in a datastore 111 for maintaining the records mapping source identifiers to entity identifiers, among other entity data for each entity. Accordingly, the user device 103 may employ the communication application 150 to interface with the entity data management system 110 to acquire entity data for identifying the other device 104 and/or providing any other suitable information to the user via the communication interface 152.

In some embodiments, an entity data updater 156 may send an entity data request 105 to the entity data management system 110 via an entity data application programming interface 117 or other suitable interface technology. In some embodiments, the term "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, the entity data management system 110 may maintain and/or manage entity data for each available or known entity. In some embodiments, the entity data management system 110 may be a part of any suitable computing device and/or system. For example, the entity data management system 110 may include hardware and software components including physical computing hardware (e.g., one or more laptop computers, desktop computers, mobile computing devices, servers, etc.), virtual computing resources (e.g., one or more virtual machines and/or operating system containers), or any suitable combination thereof. For example, the entity data management system 110 may be implemented as a service on a cloud platform.

In some embodiments, the entity data management system 110 may include hardware components such as a processor 112, which may include local or remote processing components. In some embodiments, the processor 112 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 112 may include data-processing capacity provided by the microprocessor. In some embodiments, the microprocessor may include memory, processing, interface resources, controllers, and counters. In some embodiments, the microprocessor may also include one or more programs stored in memory.

Similarly, the entity data management system 110 may include datastore 111, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the datastore 111 may include, e.g., a suitable non-transient computer readable medium such as, e.g., random access memory (RAM), read only memory (ROM), one or more buffers and/or caches, among other memory devices or any combination thereof.

In some embodiments, the entity data management system 110 may implement computer engines for inferring relevant entities to the user, e.g., based on electronic activities performed between the user and other entities. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to intelligently provide entity data to the communication application 150, the entity data management system 110 may provide entity data for entities that are relevant to the user or otherwise likely to contact the user via the communication application 150. To do so, the entity data management system 110 may leverage user-related activities, including one or more electronic activities conducted using a connected electronic activity execution device 101.

In some embodiments, the electronic activity execution device 101 may include any computing device from electronic activities are performed or executed, such as, e.g., a terminal, personal computer, or mobile computing device for performing Internet-based and application-based activities (e.g., account logins, account information changes, online purchases, instant message communications, social media posts, among others and combinations thereof). For example, the electronic activity execution device 101 may include a physical terminal for performing electronic transactions, such as, e.g., a point-of-sale device, automated teller machine (ATM) or other device. As a result of a user executing electronic activities via the electronic activity execution device 101, data entries may be produced for entry into the user's account. For example, the electronic activity execution device 101 may produce an electronic activity data entry 102.

In some embodiments, the electronic activity data entry 102 may include, e.g., a user identifier associated with each data entry, an entity identifier associated with each data entry, an activity type identifier, an activity value or activity quantity, a time data item, a location data item, a date data item, a device type or device identifier associated with the electronic activity execution device 101, an activity description, or other attributes representing characteristics of each data entry.

For example, the electronic activity data entry 102 may include a transaction-related activity, such as a transaction record (e.g., transaction authorization request, posted transaction, etc.). In such an example, the data items may include, e.g., a transaction value, a transaction type, an account identifier, or a user identifier or both, a merchant identifier, a transaction authorization date, a transaction post date, a transaction location, an execution device (e.g., point-of-sale device, Internet payment, etc.) among other transaction data and combinations thereof.

In another example, the electronic activity data entry 102 may include one or more communications, e.g., with the communication application 150 or another suitable communication endpoint. In such an example, the data items may include, e.g., communication data size, communication duration, communication time, communication date, among other communication data items or any combination thereof.

In some embodiments, the entity data management system 110 may receive the electronic activity data entry 102 and use a profile management service 120 to record the electronic activity data entry 102. In some embodiments, the profile management service 120 may access a datastore 111 and identify a user profile 115 associated with the electronic activity data entry 102. The profile management service 120 may use the user identifier of the electronic activity data entry 102 to query the datastore 111. The user identifier may be an account and/or profile identifier or may be any other suitable user identifier that is associated with a user profile 115 of the user. Thus, the datastore 111 may return the user profile 115 associated with the user. Accordingly, the profile management service 120 may enter the electronic activity data entry 102 into an activity history 116 that records the data of each electronic activity data entry associated with the user profile 115.

In some embodiments, the datastore 111 may include any suitable data storage solution including, e.g., a suitable memory or storage solutions for maintaining electronic data representing the activity histories for each account. For example, the data storage solution may include database technology such as, e.g., a centralized or distributed database, cloud storage platform, decentralized system, server, or server system, among other storage systems. In some embodiments, the data storage solution may, additionally or alternatively, include one or more data storage devices such as, e.g., a hard drive, solid-state drive, flash drive, or other suitable storage device. In some embodiments, the data storage solution may, additionally or alternatively, include one or more temporary storage devices such as, e.g., a random-access memory, cache, buffer, or other suitable memory device, or any other data storage solution and combinations thereof.

In some embodiments, a "database" may refer to an organized collection of data, stored, accessed or both electronically from a computer system. The database may include a database model formed by one or more formal design and modeling techniques. The database model may include, e.g., a navigational database, a hierarchical database, a network database, a graph database, an object database, a relational database, an object-relational database, an entity—relationship database, an enhanced entity—relationship database, a document database, an entity—attribute—value database, a star schema database, or any other suitable database model and combinations thereof. For example, the database may include database technology such as, e.g., a centralized or distributed database, cloud storage platform, decentralized system, server, or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

Depending on the database model of the datastore 111, one or more database query languages may be employed to retrieve data from the datastore 111. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages.

In some embodiments, the datastore 111 of the entity data management system 110 may maintain a library of entity data in an entity data library 114. The entity data management system 110 may aggregate entity from one or more sources. For example, the entities cataloged in the entity data library 114 may also be users with user profiles 115 in the datastore 111, for example the entities may be customers of a bank, including merchants, vendors, venues, individuals, services, etc. In some embodiments, the entity data management system 110 may scrape data from websites to acquire entity data from the internet, may request entity data from one or more entity-related API's or entity data source API's (e.g., a search engine, social media, delivery service, ratings, and reviews service, contact or telephone number lists, address list, etc.), among other sources or any combination thereof. In some embodiments, the entity data may be extracted from or otherwise augmented by the data items of the electronic activity data entries 102, such as, e.g., entity location, an entity name and/or identifier, among other data or any combination thereof.

In some embodiments, the entity data for each entity may be cataloged in the entity data library 114. In some embodiments, the entity data may include, e.g., an entity identifier, an entity telephone number, an entity callback number (e.g., different from a telephone number listed for the entity), an entity address or other entity location (e.g., latitude-longitude, landmark, etc.), an entity website, an entity email address, an entity social media account, among other data or any combination thereof.

In some embodiments, upon receiving the entity data request 105, the entity data API 117 may route the query to the profile management service 120. In some embodiments, the entity data request 105 may include user attributes, such as, e.g., a user profile identifier, a user identifier, a device identifier, etc., a user location, a data, a time, among other attributes or any combination thereof.

In some embodiments, to determine the entities with which the user has interacted, the entity data management system 110 may include computer engines including, e.g., a profile management service 120, to access in the datastore 111 the user profile 115 of the user and the activity history 116 associated with the user profile 115. In some embodiments, in order to implement the profile management service 120, the profile management service 120 may include dedicated and/or shared software components, hardware components, or a combination thereof. For example, the profile management service 120 may include a dedicated processor and storage. However, in some embodiments, the profile management service 120 may share hardware resources, including the processor 112 and datastore 111 of the entity data management system 110 via, e.g., a bus 113.

In some embodiments, the profile management service 120 may identify the user profile 115 associated with the entity data request 105, e.g., based on the user profile identifier, the user identifier, the device identifier, etc. The profile management service 120 may then query the datastore 111 to access the user profile 115 associated with the user of the user device 103. The datastore 111, in response to the query, may return the user profile 115 such that the profile management service 120 may access the activity history 116 of the user profile 115. In some embodiments, the activity history 116 may be used to identify entities with which the user has engaged in electronic activities. Thus, relevance may be inferred from the activity history 116 according to, e.g., frequency, recency and/or quantity of electronic activities with each entity in the entity data library 114.

In some embodiments, to infer the relevancy of entities, the profile management service 120 may extract the electronic activity data entries 121 from the activity history 116 of the user profile 115. In some embodiments, the profile management service 120 may extract all of the electronic activity data entries 121. Alternatively, the profile management service 120 may extract a subset of the electronic activity data entries 121 such as the electronic activity data entries 121 from a particular period of time, having particular attributes or parameters, from a particular location, or any suitable combination thereof. For example, the profile management service 120 may query the datastore 111 for electronic activity data entries 121 within a predetermined amount of time from a current time, within a predetermined distance from the user's location (e.g., based on the location data of the entity data request 105, among other parameters for a query or any combination thereof.

For example, the predetermined amount of time may be, e.g., within 1 day, 1 week, 1 month, 3 months, 4 months, 6 months, 1 year, or longer or any other suitable amount of time in the range of, e.g., 1 day to 2 years.

For example, the predetermined distance may be, e.g., within 1 mile, 2 miles, 3 miles, 4 miles, 5 miles, 6 miles, 7 miles, 8 miles, 9 miles, 10 miles, 15 miles, 20 miles, 25 miles, 30 miles, 35 miles, 45 miles, 50 miles, 55 miles, 60 miles, 70 miles, 80 miles, 85 miles, 90 miles, 95 miles, 100 miles, 150 miles, 200 miles, 250 miles, 500 miles, or any other suitable distance in a range of, e.g., 1 to 1000 miles. Alternatively, or additionally, the predetermined distance may be, e.g., in a same neighborhood, town, city, county, zip code, state, territory, province, region, country, continent or other suitable geographic region or any combination thereof.

In some embodiments, the profile management service 120 may provide the electronic activity data entries 121 to a computer engine including, e.g., a feature extraction engine 130. The entity data management system 110 may use the feature extraction engine 130 to formulate feature vectors for each entity with which the user has interacted. In some embodiments, in order to implement the feature extraction engine 130, the feature extraction engine 130 may include dedicated and/or shared software components, hardware components, or a combination thereof. For example, the feature extraction engine 130 may include a dedicated processor and storage. However, in some embodiments, the feature extraction engine 130 may share hardware resources, including the processor 112 and datastore 111 of the entity data management system 110 via, e.g., a bus 113.

In some embodiments, the feature extraction engine 130 may group the electronic activity data entries 121 by entity identifier. Based on the grouped electronic activity data entries 121, features may be extracted and/or generated for each entity based on the electronic activities between the user and each entity. In some embodiments, the features may include attributes regarding user interactions with each entity such as, e.g., time since a most recent electronic activity, most common location associated with electronic activities, type of each electronic activity data entry 121, most common type of electronic activity data entry 121, statistical metrics associated with electronic activity data entries 121 associated with each entity, such as, e.g., frequency of electronic activities, frequency of each type of electronic activity data entry 121, average quantity/amount/value associated with electronic activities, average quantity/amount/value associated with of each type of electronic activity data entry 121, median quantity/amount/value associated with electronic activities, median quantity/amount/value associated with of each type of electronic activity data entry 121, maximum quantity/amount/value associated with electronic activities, maximum quantity/amount/value associated with of each type of electronic activity data entry 121, minimum quantity/amount/value associated with electronic activities, minimum quantity/amount/value associated with of each type of electronic activity data entry 121, among other activity-related features for each entity or any combination thereof.

In some embodiments, the feature extraction engine 130 may also use the electronic activity data entries 121 to determine features associated with the user, such as, e.g., a likely future location, a likely future behavior, among other features. For example, the feature extraction engine 130 may analyze the electronic activity data entries 121 to identify travel plans based on, e.g., electronic activity including purchases of flight tickets or a hotel booking, web browsing data on a travel site, a social media subscription or notification preference for a particular travel locale or other activity or any combination thereof. Such future travel and/or future location may be used to influence the relevant entities.

In some embodiments, the features may be encoded in one or more feature vectors 131. For example, a feature vector 131 may include structured data recording values for each feature. In some embodiments, a first feature vector 131 for activity-related features associated with each entity may be generated and a second feature vector 131 may be used for user-related features including, e.g., location, future location, etc. In some embodiments, the first and second feature vectors 131 may concatenated into a single feature vector 131.

In some embodiments, to determine the relevance of each entity based on each feature vector 131, the entity data management system 110 may include computer engines including, e.g., an entity relevancy model engine 140. In some embodiments, in order to implement the entity relevancy model engine 140, the entity relevancy model engine 140 may include dedicated and/or shared software components, hardware components, or a combination thereof. For example, the entity relevancy model engine 140 may include a dedicated processor and storage. However, in some embodiments, the entity relevancy model engine 140 may share hardware resources, including the processor 112 and datastore 111 of the entity data management system 110 via, e.g., a bus 113.

In some embodiments, the entity relevancy model engine 140 may ingest the feature vector(s) 131 and utilize an entity relevancy machine learning model 142 to predict a degree of relevance of each entity to the user based on the feature vector(s) 131. In some embodiments, relevancy of each entity may be predicted individually based on one or more feature vector(s) 131 corresponding to each entity.

In some embodiments, the entity relevancy machine learning model 142 may be developed and/or configured utilizing one or more exemplary AI/machine learning techniques chosen from, but not limited to, decision trees, boosting, support-vector machines, neural networks, nearest neighbor algorithms, Naive Bayes, bagging, random forests, and the like. For example, in some embodiments, the entity relevancy machine learning model 142 may employ a clustering algorithm to cluster all known entities (e.g., for all entities for which entity data records exist in the entity data library 114), or for all entities with which the user has logged electronic activity data entries 121 in the activity history 116, or a combination thereof. The clustering may be performed based on the features of the electronic activity data entries 121 and/or the attributes representing characteristics of each data entry or any combination thereof. All entities within a predetermined distance threshold may be identified for caching in the entity data cache 154. In some embodiments, the clustering may be performed on a filtered set of the entities, such as entities with locations within a defined geographic area, having certain operating hours or contact hours, or other suitable filtering parameter or any combination thereof.

For example, the clustering may be performed based on a clustering of transaction activities to infer relevance to the user based on transactions, and thus a likelihood to exchange communications. Alternatively, or in addition, a clustering of prior communications may be performed to directly infer a likelihood of exchanging communications.

In some embodiments and, optionally, in combination of any embodiment described above or below, a neutral network technique may be employed to infer relevance based on the electronic activity data entries 121. Thus, a supervised or semi-supervised learning scheme may be employed to correlate the electronic activity data entries 121 for relevance to communications. In some embodiments, the neural network technique may employ one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
 a. define Neural Network architecture/model,
 b. transfer the input data to the exemplary neural network model,
 c. train the exemplary model incrementally,
 d. determine the accuracy for a specific number of timesteps,
 e. apply the exemplary trained model to process the newly-received input data,
 f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

Accordingly, in some embodiments, based on a trained classifier and/or regression layer of the relevancy machine learning model 142, the entity relevancy model engine 140 may produce for each entity a value indicative of a degree of relevance to the user. In some embodiments, the entity relevancy machine learning model 142 may include, e.g., a classifier model, and thus may include a classifier layer having parameters trained to produce a probability value indicative of a probability associated with one or more labels based on the attributes encoded in the feature vector(s) 131. In some embodiments, the parameters may include learned parameters, such as learned node weights or other suitable learned parameters. For such a classifier model, an output layer of the entity relevancy machine learning model 142 may decode the probability value(s) to apply a label indicative of a degree of relevance of each entity. For example, the output layer may be configured for single class classification where the output layer determines a label including, e.g., "relevant", where a probability value(s) not indicative of a label of "relevant" would be labeled as "not relevant". In some embodiments, the output layer may be configured for a multi-class classification with labels for, e.g., "high relevance", "medium relevance", "low relevance", "no relevance", or any other suitable scale of relevance.

In some embodiments, the output layer may apply a label of "relevant" or "not relevant" based on a comparison of the probability value of each entity. For example, the output layer may identify a highest ranking set of entities as relevant entities based on a ranking of the associated probability values. In some embodiments, the highest ranking set may include, e.g., a top 5, 10, 30, 40, 50, 60, 70, 80, 90, 100, 200, 250, 300, or more entities in a list ordered according to magnitude of probability value, or any other suitable number of entities in a range from 1 to 1000. In some embodiments, the highest ranking set may include entities having a probability value in a highest percentile set, such as, e.g., $75^{th}$ percentile, $80^{th}$ percentile, $85^{th}$ percentile, $90^{th}$ percentile, $95^{th}$ percentile, $96^{th}$ percentile, $97^{th}$ percentile, $98^{th}$ percentile, $99^{th}$ percentile, or any other suitable percentile. Any other suitable technique for identifying the most relevant entities may be employed.

In some embodiments, the relevant entities may be determined based on a memory size allocated to the entity data cache 154. For example, the entity data request 105 may specify an entity data cache size, and the entity relevancy model engine 140 may use the entity data cache size to determine a number of entities to include in the set of relevant entities based on a size of each entity data record recording the entity data.

In some embodiments, a set of one or more records of the relevant entities 141 may be provided to the entity data API 117 to send to the entity data updater 156. In some embodiments, the set of records of the relevant entities 141 may include a list of the relevant entities. The entity data API 117 may use the list to query the datastore 111 for entity data records for each entity in the list. In some embodiments, the entity data records may be cataloged in the entity data library 114. Thus, the datastore 111 may return from the entity data library 114 the entity data record associated with each entity in the list of relevant entities.

In some embodiments, the entity data API 117 may receive the entity data record(s) for the records of the relevant entities 141 and generate at least one entity data record message 107 to communicate the entity data of the records of the relevant entities 141. In some embodiments, delivering the entity data of all the records of the relevant entities 141 may result in excess network resources being used to communicate duplicative data, in an ever-growing set of entity data records cached on the user device 103 and/or in the caching of duplicate entity data records. Accordingly, the entity data API 117 may determine whether or not each relevant entity 141 is already cached ("pre-cached") in the entity data cache 154 of the user device 103.

In some embodiments, the entity data API 117 may ping the communication application 150 to request a list of entities that have data pre-cached in the entity data cache 154. In some embodiments, to reduce the use of network resources, the datastore 111 may maintain a parallel list of pre-cached entities in the entity data cache 154, e.g., stored in the user profile 115. In some embodiments, the list of pre-cached entities may be updated each time the entity data API 117 receives a set of records of the relevant entities 141 (e.g., in response to each entity data request 105).

In some embodiments, using the list, whether accessed via the datastore 111 or received from the communication application 150, the entity data API 117 may compare the pre-cached entities to the records of the relevant entities 141. Entities that are on the list of pre-cached entities and the records of the relevant entities 141 may be identified as relevant pre-cached entities, while entities that are pre-cached and not among the records of the relevant entities 141 may be identified as pre-cached non-relevant entities and entities that are not pre-cached but are among the relevant entities may be identified as un-cached relevant entities.

In some embodiments, in order to ensure efficient use of storage resources of the user device 103, only relevant entities may be maintained in the entity data cache 154. Thus, non-relevant entities may be removed. Accordingly, in some embodiments, the entity data API 117 may generate the entity data record message 107 to deliver the entity data of the relevant un-cached entities, an entity data record cache instruction to cache the entity data of the relevant un-cached entities, and/or an entity data record removal instruction to delete or otherwise remove the entity data of the non-relevant pre-cached entities. Thus, non-relevant entity data may be removed, relevant pre-cached entity data may be maintained, and relevant un-cached entity data may be delivered to update the entity data cache 154. Accordingly, the entity data cache 154 may be intelligently updated to provide a cache of entity data for entities that are likely to contact the user via the communication application 150, thus enabling the communication application 150 to efficiently provide entity data to the user via the communication interface 152 using local data.

In some embodiments, the entity data updater 156 may also send requests in real-time to the entity data management system 110 for entity data in response to a communication being received from an entity for whom the entity data is not cached in the entity data cache 154. Thus, the communication application 150 may include a fallback in the case that the records of the relevant entities 141 do not include the entity from whom the communication is received. Such a fallback may require network communication to the entity data management system 110, and thus incur a delay or lag between receiving the communication and display on the communication interface 152 of the associated entity data. Alternatively, or in addition, the communication interface 152 may omit entity data for communications from any entity for whom entity data is not cached in the entity data cache 154.

Figure 3:
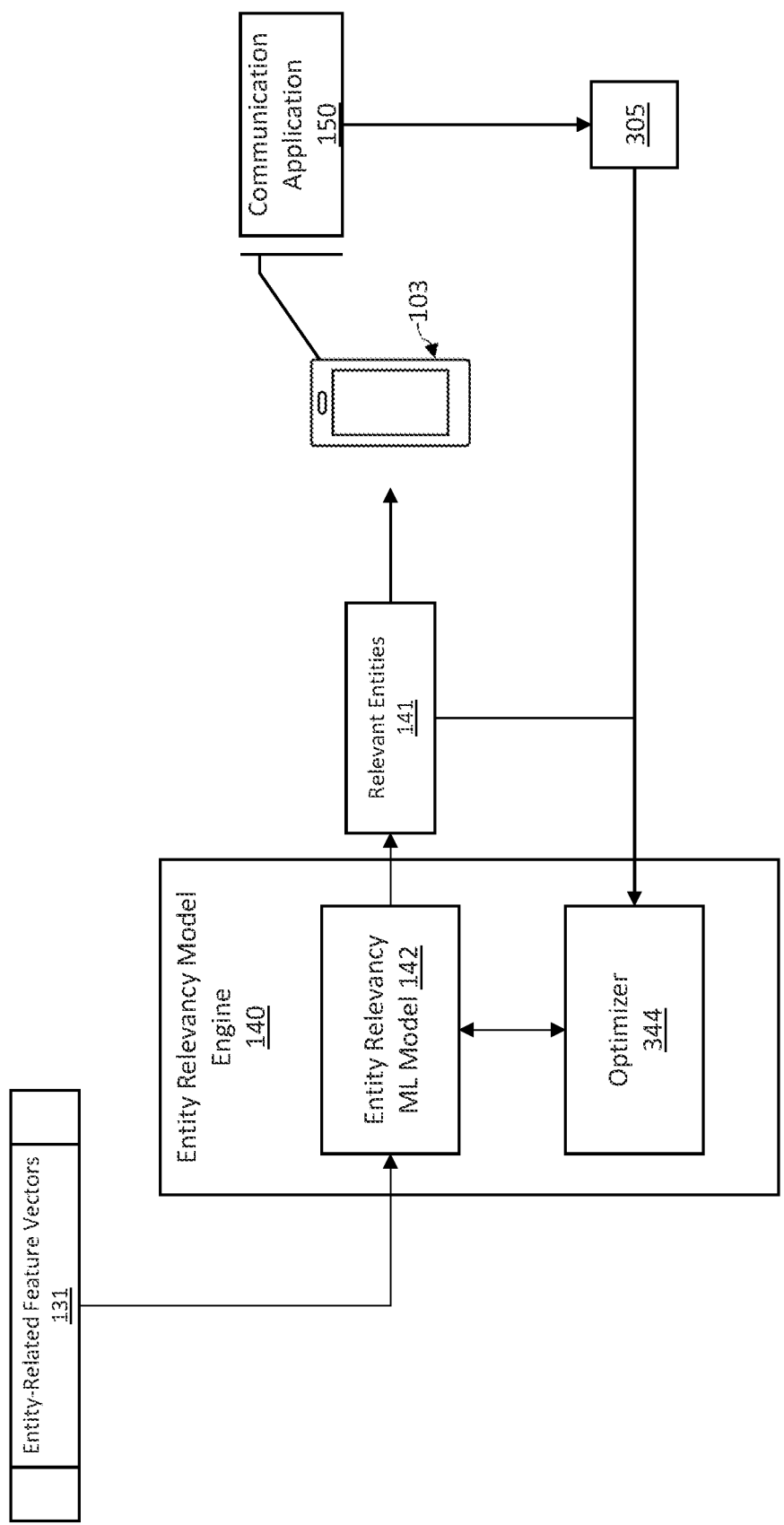
FIG. 3 is a block diagram of entity relevancy model engine for predictive retrieval and caching of relevant entity data on a user device in accordance with one or more embodiments of the present disclosure.

FIG. 3 is a block diagram of entity relevancy model engine for predictive retrieval and caching of relevant entity data on a user device in accordance with one or more embodiments of the present disclosure.

In some embodiments, the entity relevancy model engine 140 may utilize the entity relevancy ML model 142 to predict entities relevant to the user, e.g., based on electronic activities of the user. In some embodiments, the entity relevancy ML model 142 may include, e.g., a classifier machine learning model to classify entities as relevant or non-relevant based on an associated feature vector 131. In some embodiments, the entity relevancy ML model 142 may be pretrained for general applicability, and then tailored to a particular user based on user feedback 305 into the entity relevancy model engine 140.

In some embodiments, the entity relevancy ML model 142 ingests a particular feature vector that encodes features representative of activity attributes characterizing electronic activities that the user has performed relative to a particular entity. In some embodiments, the entity relevancy ML model 142 processes the feature vector with parameters to produce a prediction of records of the relevant entities 141. In some embodiments, the parameters of the entity relevancy ML model 142 may form a suitable machine learning model including a classifier machine learning model, such as, e.g., a convolutional neural network (CNN), a Naive Bayes classifier, decision trees, random forest, support vector machine (SVM), K-Nearest Neighbors, or any other suitable algorithm for a classification model. In some embodiments, for computational efficiency while preserving accuracy of predictions, the entity relevancy ML model 142 may advantageously include a random forest classification model.

In some embodiments, the entity relevancy ML model 142 processes the features encoded in the feature vector by applying the parameters of the classification model to produce a model output vector. In some embodiments, the model output vector may be decoded to generate one or more labels indicative of records of the relevant entities 141. In some embodiments, the model output vector may include or may be decoded to reveal a numerical output, e.g., one or more probability values between 0 and 1 where each probability value indicates a degree of probability that a particular label correctly classifies the feature vectors 131. In some embodiments, the degree of probability may be interpreted as a degree of relevancy whereby the probability that a particular entity is relevant corresponds to the degree to which the particular entity is relevant. In some embodiments, a regression model may be used instead of a classification model to explicitly predict a degree of relevancy. Such a regression model may be similarly pre-trained and tailored using feature vectors.

In some embodiments, the entity relevancy ML model 142 may test each probability value against a respective probability threshold. In some embodiments, each probability value has an independently learned and/or configured probability threshold. Alternatively, or additionally, in some embodiments, one or more of the probability values of the model output vector may share a common probability threshold. In some embodiments, where a probability value is greater than the corresponding probability threshold, the feature vectors 131 is labeled according to the corresponding label. For example, the probability threshold can be, e.g., greater than 0.5, greater than 0.6, greater than 0.7, greater than 0.8, greater than 0.9, or other suitable threshold value. Therefore, in some embodiments, the entity relevancy ML model 142 may produce the records of the relevant entities 141 for a particular feature vectors 131 based on the probability value(s) of the model output vector and the probability threshold(s).

In some embodiments, the parameters of the entity relevancy ML model 142 may be trained based on known outputs, e.g., for initial training for general applicability or specifically for the user. For example, the feature vectors 131 may be paired with a target classification or known classification to form a training pair, such as a historical feature vectors 131 and an observed result and/or human annotated classification denoting whether the historical feature vectors 131 is associated with a relevant entity or a non-relevant entity. In some embodiments, the feature vectors 131 may be provided to the entity relevancy ML model 142, e.g., encoded in a feature vector, to produce a predicted label. In some embodiments, an optimizer 344 associated with the entity relevancy ML model 142 may then compare the predicted label with the known output of a training pair including the historical feature vectors 131 to determine an error of the predicted label. In some embodiments, the optimizer 344 may employ a loss function, such as, e.g., Hinge Loss, Multi-class SVM Loss, Cross Entropy Loss, Negative Log Likelihood, or other suitable classification loss function to determine the error of the predicted label based on the known output.

In some embodiments, the known output may be obtained after the entity relevancy ML model 142 produces the prediction, such as in online learning scenarios. In such a scenario, the entity relevancy ML model 142 may receive the feature vectors 131 and generate the model output vector to produce a label classifying the feature vectors 131. Subsequently, a user may provide feedback by, e.g., modifying, adjusting, removing, and/or verifying the label via a suitable feedback mechanism, such as a user interface device (e.g., keyboard, mouse, touch screen, user interface, or other interface mechanism of a user device or any suitable combination thereof). The feedback may be paired with the feature vectors 131 to form the training pair and the optimizer 344 may determine an error of the predicted label using the feedback.

In some embodiments, based on the error, the optimizer 344 may update the parameters of the entity relevancy ML model 142 using a suitable training algorithm such as, e.g., backpropagation for a classifier machine learning model. In some embodiments, backpropagation may include any suitable minimization algorithm such as a gradient method of the loss function with respect to the weights of the classifier machine learning model. Examples of suitable gradient methods include, e.g., stochastic gradient descent, batch gradient descent, mini-batch gradient descent, or other suitable gradient descent technique. As a result, the optimizer 344 may update the parameters of the entity relevancy ML model 142 based on the error of predicted labels in order to train the entity relevancy ML model 142 to model the correlation between feature vectors 131 and records of the relevant entities 141 in order to produce more accurate labels of feature vectors 131.

In some embodiments, each feature vector 131 this is classified as relevant may result in the associated entities being classified as the records of the relevant entities 141. The records of the relevant entities 141 may be provided to the user device 103 as described above with reference to FIG. 1. In some embodiments, the records of the relevant entities 141 of the entity data request 105 may trigger the user device 103 to generate and display the communication application 150. In some embodiments, the communication application 150 includes a depiction or representation of, e.g., the entity data upon delivery to the user device 103. In some embodiments, the communication application 150 may include an interface element to confirm or deny the records of the relevant entities 141. For example, the user may input a feedback 305 with an option to confirm the records of the relevant entities 141 as correct or deny the records of the relevant entities 141 as incorrect. In some embodiments, the feedback 305 may include a user selection of a confirm option or a deny option relative to the records of the relevant entities 141.

In some embodiments, the feedback 305 may include one or more relevancy metrics associated with entity data and exchanged communications. In some embodiments, the communication application 150 may track communication metrics, such as, e.g., a time and/or date at which a communication is exchanged, communication data for each communication exchanged (e.g., the originating phone number, user profile identifier, social media handle, email address, etc.), a location of the user device 103 when a communication is exchanged, among other metrics or any combination thereof. The communication metrics may then be compared against relevancy of entity data records, such as, the entity data records cached in the entity data cache 154, entity data records added as relevant to the entity data cache 154, entity data records removed as irrelevant from the entity data cache 154, entity data records that are unchanged as to predicted relevance, among other relevancy statuses or any combination thereof. Based on the communication metrics and the predicted relevancy of each communication exchanged, of each cached entity data record, or each removed entity data record, or any combination thereof, relevancy metrics may be determined. The relevancy metrics may include, e.g., a number and/or frequency of communications exchanged with an entity identified as a relevant entity 141, a list and/or number of entities with which communications were exchanged but were not identified as relevant entities 141, a label or flag for each entity record of the relevant entities 141 for which communications were not exchanged, a label or flag for each entity record of the relevant entities 141 for which communications were not exchanged within a predetermined period of time, an amount of time from caching each entity record of the relevant entities 141 and exchanging communications with the entity of each entity record, a label or flag for each entity record of the relevant entities 141 for which communications were exchanged, a label or flag for each entity record of the relevant entities 141 for which communications were exchanged within the predetermined period of time, among other relevancy metrics. In some embodiments, the user device 103 may determine the relevancy metrics, the user device 103 may upload the communication metrics and/or relevancy to the entity data management system 110, or both, in order for the entity data management system 110 to determine the relevancy metrics, or by any other suitable local, remote and/or hybrid processing scheme.

In some embodiments, the feedback 305 including the relevancy metrics may be used to determine whether the prediction of each entity in the relevant entities 141 is correct based on whether communications were actually exchanged with the relevant entities 141. Thus, the relevancy metrics may enable the determination of error in model predictions for training the model.

In some embodiments, the amount of records of the relevant entities 141 may include a number that would be infeasible for the user to explicitly confirm and/or deny relevancy of each. Rather, the feedback 305 may include an indication of each record of the relevant entity 141 for which the entity data was used in a communication, e.g., via display by the communication interface 152.

In some embodiments, in the case of the entity data of a particular record of the relevant entity 141 being used, the feedback 305 may be determined to be positive feedback that the particular record of the relevant entity 141 is indeed relevant. Similarly, in the case of the entity data of a particular record of the relevant entity 141 not being used, the feedback may include negative feedback that the particular record of the relevant entity 141 is not relevant. In some embodiments, the probability that each record of the relevant entity 141 is actually used for any given communication is low. Thus, negative feedback for each record of the relevant entity 141 is greater than positive feedback. Accordingly, negative feedback may be weighted lower than positive feedback by the optimizer 344 for training purposes. For example, the negative feedback may be weighted lower than the positive feedback by, e.g., a factor of 10, 100, 1000 or other factor.

In some embodiments, the feedback 305 may be returned to the optimizer 344, e.g., at regular intervals (e.g., matching intervals at which each entity data request 105 is provided), or upon each communication by the communication application 150, or any suitable combination thereof. For example, at each interval of the regular intervals, the feedback 305 may include a record of the number of times the entity data of each record of the relevant entity 141 was used. In an example of feedback 305 upon each communication, the feedback 305 may include an indication of the entity data of a particular record of the relevant entity 141 associated with each communication.

In some embodiments, the entity relevancy model engine 140 may be trained based on records of the relevant entities 141 and the feedback 305. Based on the difference between the records of the relevant entities 141 and the feedback 305, the parameters of the classification model of the entity relevancy ML model 142 may be updated to improve the accuracy of identifying entities as relevant or non-relevant for communications via the communication application 150.

In some embodiments, training is performed using the optimizer 344. In some embodiments, the records of the relevant entities 141 fed back to the optimizer 410. The optimizer 344 may also ingest the feedback 305, such as feedback 305 described above. As described above, in some embodiments, the optimizer 344 may employ a loss function, such as, e.g., Hinge Loss, Multi-class SVM Loss, Cross Entropy Loss, Negative Log Likelihood, or other suitable classification loss function. The loss function determines an error based on the feedback 305 and the records of the relevant entities 141. In some embodiments, the optimizer 344 may, e.g., backpropagate the error to the entity relevancy ML model 142 to update the parameters using, e.g., gradient descent, heuristic, convergence or other optimization techniques and combinations thereof.

In some embodiments, the optimizer 344 may therefore train the parameters of the entity relevancy ML model 142 to approximate user behaviors in relevancy of each entity for accessing entity data based on feedback including the feedback 305. As a result, the entity relevancy ML model 142 may be continually trained and optimized based on user feedback.

Figure 4:
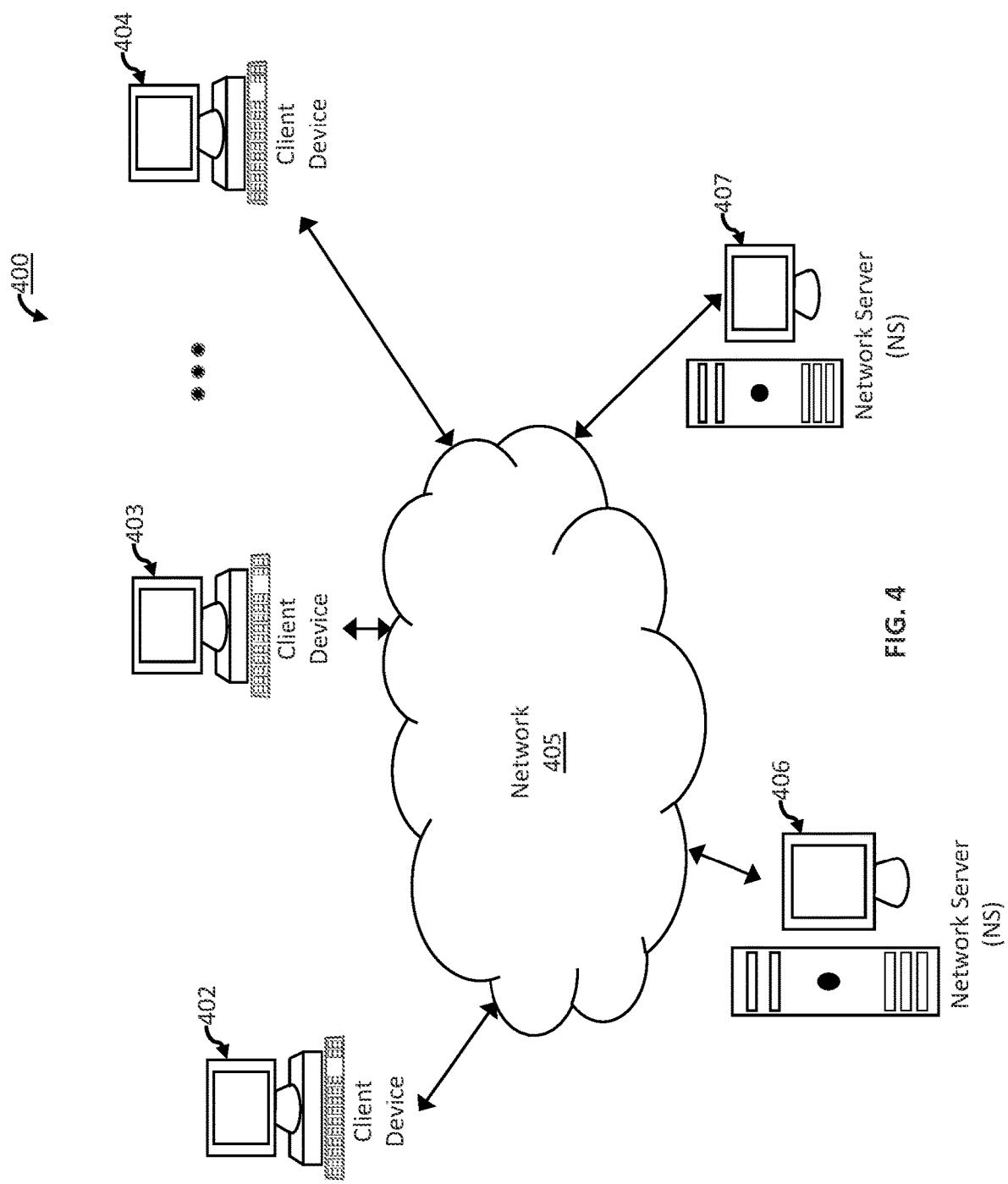
FIG. 4 depicts a block diagram of an exemplary computer-based system and platform for predictive retrieval and caching of relevant entity data in accordance with one or more embodiments of the present disclosure.

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, member computing device 402, member computing device 403 through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, GB-s citizens band radio, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 402-404 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 5:
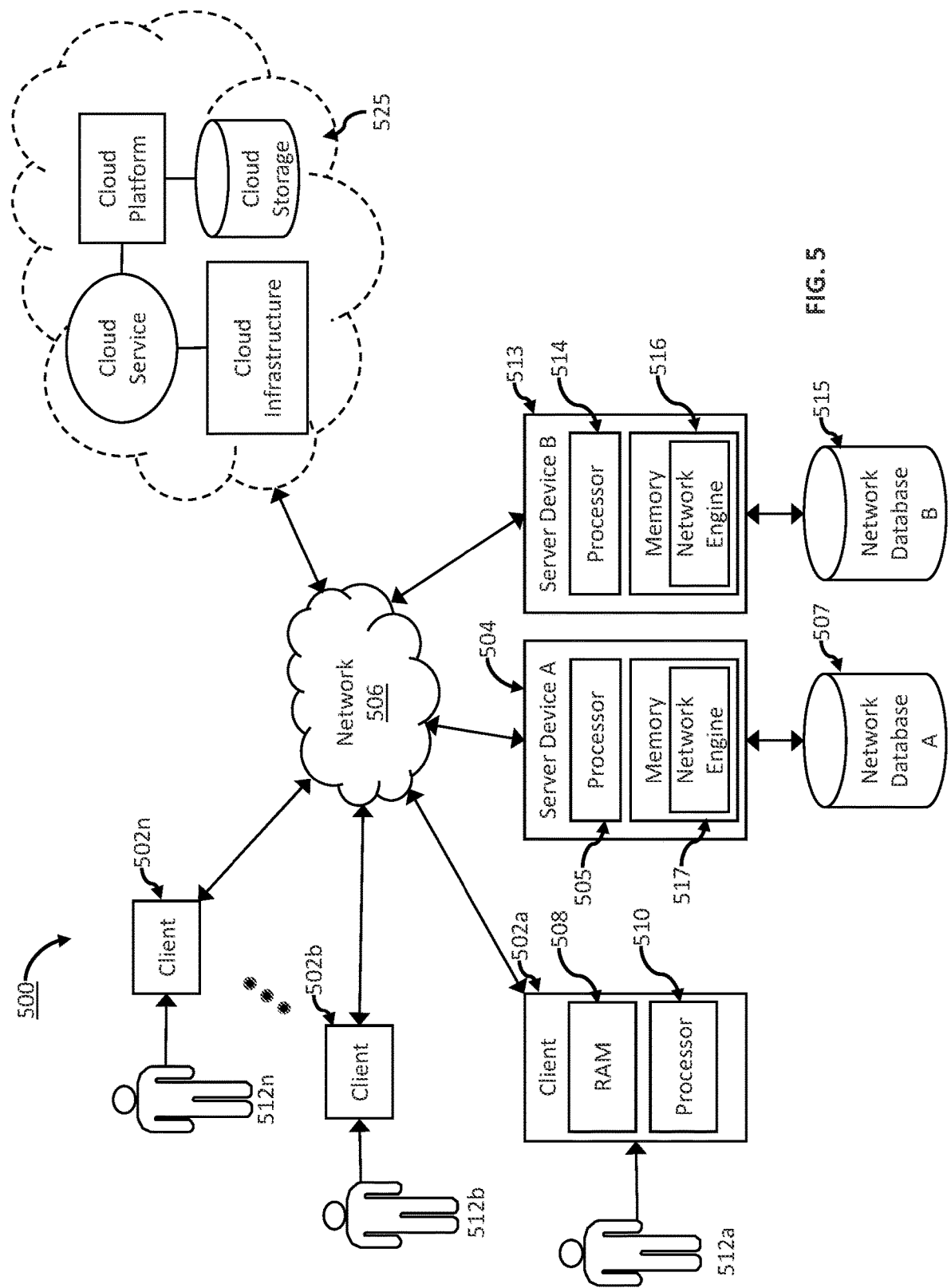
FIG. 5 depicts a block diagram of another exemplary computer-based system and platform for predictive retrieval and caching of relevant entity data in accordance with one or more embodiments of the present disclosure.

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device/client 502a, member computing device 502b through member computing device 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, user 512a, user 512b through user 512n, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
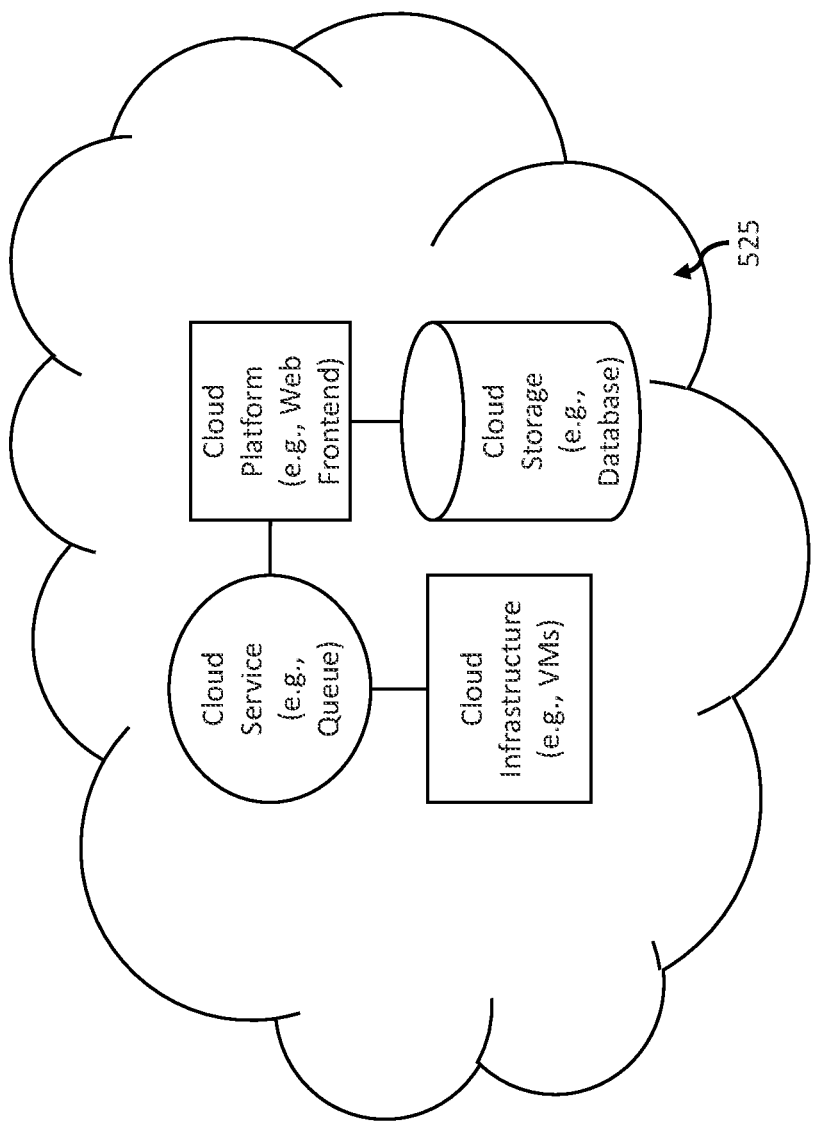
FIG. 6 depicts illustrative schematics of an exemplary implementation of the cloud computing/architecture(s) in which embodiments of a system for predictive retrieval and caching of relevant entity data may be specifically configured to operate in accordance with some embodiments of the present disclosure.
Figure 7:
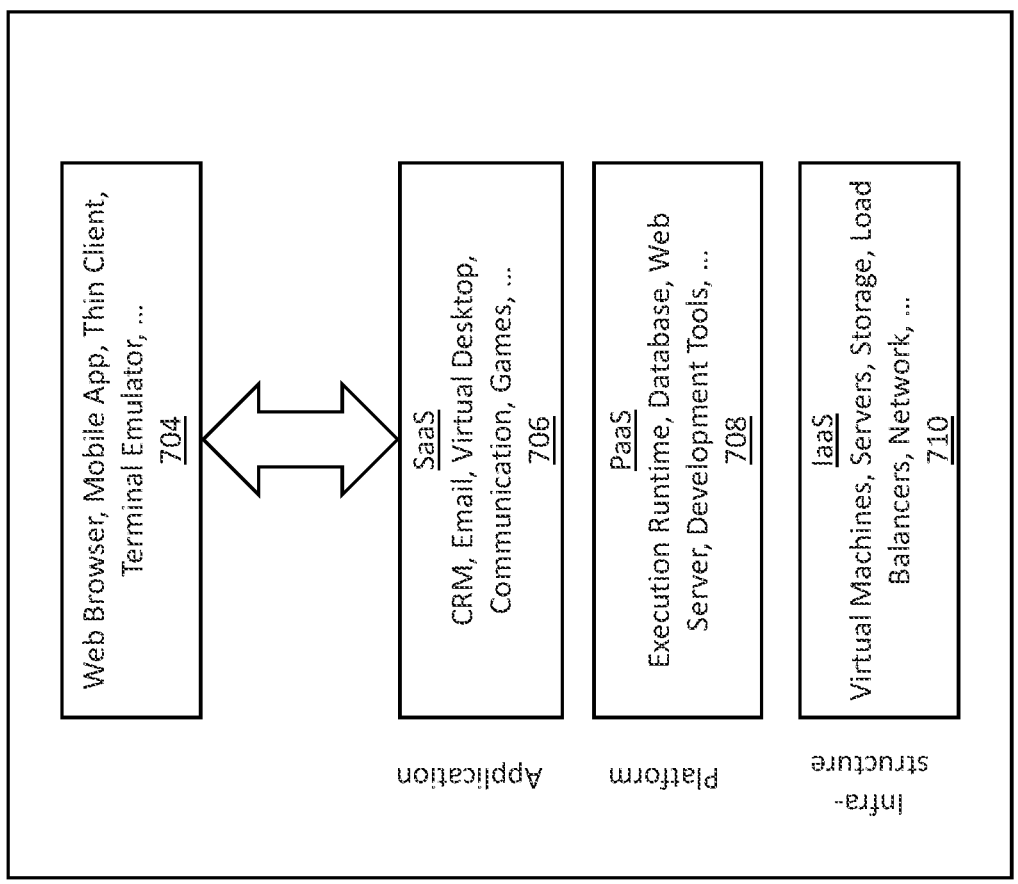
FIG. 7 depicts illustrative schematics of another exemplary implementation of the cloud computing/architecture(s) in which embodiments of a system for predictive retrieval and caching of relevant entity data may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative, and not restrictive.

At least some aspects of the present disclosure will now be described with reference to the following numbered clauses.

Clause 1. A method including:
   receiving, by at least one processor, an entity data update instruction associated with a user device;
      where the entity data update instruction includes at least one identifier associated with the user device;
   determining, by the at least one processor, a user account associated with the user device based at least in part on the at least one identifier;
   accessing, by the at least one processor, an activity history associated with the user account;
      where the activity history includes a plurality of historical electronic activity data entries;
      where each electronic activity data entry of the plurality of historical electronic activity data entries includes a plurality of activity attributes including:
         a date attribute indicating a date of each electronic activity data entry,
         a location attribute indicating a location of each electronic activity data entry and
         an entity attribute indicating an entity associated with each electronic activity data entry;
   utilizing, by the at least one processor, at least one trained entity relevancy machine learning model to predict a degree of relevance of each entity associated with the plurality of historical electronic activity data entries in the activity history based at least in part on a plurality of model parameters and the plurality of activity attributes of each electronic activity data entry;
   determining, by the at least one processor, a set of relevant entities based at least in part on the degree of relevance of each entity;
   determining, by the at least one processor, at least one pre-cached entity associated with the user device;
      where the at least one pre-cached entity includes at least one pre-cached entity data record associated with at least one entity, the at least one pre-cached entity data record being stored in a cache on the user device;
   determining, by the at least one processor, at least one un-cached relevant entity in the set of relevant entities based at least in part on the at least one pre-cached entity; and
   updating, by the at least one processor, the cache on the user device with at least one un-cached entity data record associated with the at least one un-cached relevant entity.

Clause 2. A system including:
   at least one processor configured to execute software instructions that cause the at least one processor to perform steps to:
      receive an entity data update instruction associated with a user device;

where the entity data update instruction includes at least one identifier associated with the user device;
determine a user account associated with the user device based at least in part on the at least one identifier;
access an activity history associated with the user account;
where the activity history includes a plurality of historical electronic activity data entries;
where each electronic activity data entry of the plurality of historical electronic activity data entries includes a plurality of activity attributes including:
a date attribute indicating a date of each electronic activity data entry,
a location attribute indicating a location of each electronic activity data entry and
an entity attribute indicating an entity associated with each electronic activity data entry;
utilize at least one trained entity relevancy machine learning model to predict a degree of relevance of each entity associated with the plurality of historical electronic activity data entries in the activity history based at least in part on a plurality of model parameters and the plurality of activity attributes of each electronic activity data entry;
determine a set of relevant entities based at least in part on the degree of relevance of each entity;
determine at least one pre-cached entity associated with the user device;
where the at least one pre-cached entity includes at least one pre-cached entity data record associated with at least one entity, the at least one pre-cached entity data record being stored in a cache on the user device;
determine at least one un-cached relevant entity in the set of relevant entities based at least in part on the at least one pre-cached entity; and
update the cache on the user device with at least one un-cached entity data record associated with the at least one un-cached relevant entity.

Clause 3. The system and/or method of any of clauses 1 and/or 2, further including:
determining, by the at least one processor, a memory size associated with the cache;
determining, by the at least one processor, a number of entity data records that can be stored in the cache based on the memory size; and
determining, by the at least one processor, the set of relevant entities based at least in part on the number of entity data records that can be stored in the cache.

Clause 4. The system and/or method of any of clauses 1 and/or 2, further including:
determining, by the at least one processor, at least one travel plan based at least in part on the plurality of historical electronic activity data entries; and
utilizing, by the at least one processor, the at least one trained entity relevancy machine learning model to predict the degree of relevance of each entity associated with the plurality of historical electronic activity data entries in the activity history based at least in part on the at least one travel plan, the plurality of model parameters and the plurality of activity attributes of each electronic activity data entry.

Clause 5. The system and/or method of any of clauses 1 and/or 2, further including:
receiving, by the at least one processor, at least one feedback from the user device;
where the at least one feedback includes at least one indication of use of at least one used entity data record in the cache; and
training, by the at least one processor, the at least one trained entity relevancy machine learning model based at least in part on the at least one feedback.

Clause 6. The system and/or method of any of clauses 1 and/or 2, where the at least one pre-cached entity data record includes entity identification data for communications received from at least one entity associated with the at least one entity data record by a communication application on the user device.

Clause 7. The system and/or method of any of clauses 1 and/or 2 and/or 6, where the communication application includes a telephone application, and the entity identification data includes caller identification information.

Clause 8. The system and/or method of any of clauses 1 and/or 2, further including:
determining, by the at least one processor, at least one pre-cached non-relevant entity based at least in part on the set of relevant entities and the at least one pre-cached entity;
generating, by the at least one processor, at least one entity data record removal instruction configured to cause the user device to remove the at least one pre-cached non-relevant entity; and
instructing, by the at least one processor, with the at least one entity data record removal instruction, by the at least one processor, the user device to remove the at least one pre-cached non-relevant entity from the cache.

Clause 9. The system and/or method of any of clauses 1 and/or 2, further including:
generating, by the at least one processor, at least one entity data record cache instruction configured to cause the user device to store the at least one un-cached relevant entity;
and instructing, by the at least one processor, the user device to update the cache by adding the at least one un-cached relevant entity to the cache.

Clause 10. The system and/or method of any of clauses 1 and/or 2, where the at least one trained entity relevancy machine learning model includes a classification layer configured to output at least one probability value representative of at least one probability of relevance.

Clause 11. The system and/or method of any of clauses 1 and/or 2, where the plurality of historical electronic activity data entries include a plurality of historical transactions.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
receiving, by at least one processor, an entity data update instruction associated with a user device;
   wherein the entity data update instruction comprises at least one identifier associated with the user device;
determining, by the at least one processor, a user account associated with the user device based at least in part on the at least one identifier;
accessing, by the at least one processor, an activity history associated with the user account;
   wherein the activity history comprises a plurality of historical electronic activity data entries;
   wherein each electronic activity data entry of the plurality of historical electronic activity data entries comprises a plurality of activity attributes comprising:
      a date attribute indicating a date of each electronic activity data entry,
      a location attribute indicating a location of each electronic activity data entry and
      an entity attribute indicating an entity associated with each electronic activity data entry;
utilizing, by the at least one processor, at least one trained entity relevancy machine learning model to predict a degree of relevance of each entity associated with the plurality of historical electronic activity data entries in the activity history based at least in part on a plurality of model parameters and the plurality of activity attributes of each electronic activity data entry;
determining, by the at least one processor, a set of relevant entities based at least in part on the degree of relevance of each entity;
determining, by the at least one processor, at least one pre-cached entity associated with the user device;
   wherein the at least one pre-cached entity comprises at least one pre-cached entity data record associated with at least one entity, the at least one pre-cached entity data record being stored in a cache on the user device;
determining, by the at least one processor, at least one un-cached relevant entity in the set of relevant entities based at least in part on the at least one pre-cached entity; and
updating, by the at least one processor, the cache on the user device with at least one un-cached entity data record associated with the at least one un-cached relevant entity.

2. The method of claim 1, further comprising:
determining, by the at least one processor, a memory size associated with the cache;
determining, by the at least one processor, a number of entity data records that can be stored in the cache based on the memory size; and
determining, by the at least one processor, the set of relevant entities based at least in part on the number of entity data records that can be stored in the cache.

3. The method of claim 1, further comprising:
determining, by the at least one processor, at least one travel plan based at least in part on the plurality of historical electronic activity data entries; and
utilizing, by the at least one processor, the at least one trained entity relevancy machine learning model to predict the degree of relevance of each entity associated with the plurality of historical electronic activity data entries in the activity history based at least in part on the at least one travel plan, the plurality of model parameters and the plurality of activity attributes of each electronic activity data entry.

4. The method of claim 1, further comprising:
receiving, by the at least one processor, at least one feedback from the user device;
   wherein the at least one feedback comprises at least one indication of use of at least one used entity data record in the cache; and
training, by the at least one processor, the at least one trained entity relevancy machine learning model based at least in part on the at least one feedback.

5. The method of claim 1, wherein the at least one pre-cached entity data record comprises entity identification data for communications received from at least one entity associated with the at least one entity data record by a communication application on the user device.

6. The method of claim 5, wherein the communication application comprises a telephone application and the entity identification data comprises caller identification information.

7. The method of claim 1, further comprising:
determining, by the at least one processor, at least one pre-cached non-relevant entity based at least in part on the set of relevant entities and the at least one pre-cached entity;
generating, by the at least one processor, at least one entity data record removal instruction configured to cause the user device to remove the at least one pre-cached non-relevant entity; and
instructing, by the at least one processor, with the at least one entity data record removal instruction, by the at least one processor, the user device to remove the at least one pre-cached non-relevant entity from the cache.

8. The method of claim 1, further comprising:
generating, by the at least one processor, at least one entity data record cache instruction configured to cause the user device to store the at least one un-cached relevant entity; and
instructing, by the at least one processor, the user device to update the cache by adding the at least one un-cached relevant entity to the cache.

9. The method of claim 1, wherein the at least one trained entity relevancy machine learning model comprises a classification layer configured to output at least one probability value representative of at least one probability of relevance.

10. The method of claim 1, wherein the plurality of historical electronic activity data entries comprise a plurality of historical transactions.

11. A system comprising:
at least one processor configured to execute software instructions that cause the at least one processor to perform steps to:
   receive an entity data update instruction associated with a user device;
      wherein the entity data update instruction comprises at least one identifier associated with the user device;
   determine a user account associated with the user device based at least in part on the at least one identifier;
   access an activity history associated with the user account;
      wherein the activity history comprises a plurality of historical electronic activity data entries;

wherein each electronic activity data entry of the plurality of historical electronic activity data entries comprises a plurality of activity attributes comprising:
- a date attribute indicating a date of each electronic activity data entry,
- a location attribute indicating a location of each electronic activity data entry and
- an entity attribute indicating an entity associated with each electronic activity data entry;

utilize at least one trained entity relevancy machine learning model to predict a degree of relevance of each entity associated with the plurality of historical electronic activity data entries in the activity history based at least in part on a plurality of model parameters and the plurality of activity attributes of each electronic activity data entry;

determine a set of relevant entities based at least in part on the degree of relevance of each entity;

determine at least one pre-cached entity associated with the user device;
- wherein the at least one pre-cached entity comprises at least one pre-cached entity data record associated with at least one entity, the at least one pre-cached entity data record being stored in a cache on the user device;

determine at least one un-cached relevant entity in the set of relevant entities based at least in part on the at least one pre-cached entity; and update the cache on the user device with at least one un-cached entity data record associated with the at least one un-cached relevant entity.

12. The system of claim 11, wherein the at least one processor is further configured to execute the software instructions that cause the at least one processor to perform steps to:
- determine a memory size associated with the cache;
- determine a number of entity data records that can be stored in the cache based on the memory size; and
- determine the set of relevant entities based at least in part on the number of entity data records that can be stored in the cache.

13. The system of claim 11, wherein the at least one processor is further configured to execute the software instructions that cause the at least one processor to perform steps to:
- determine at least one travel plan based at least in part on the plurality of historical electronic activity data entries; and
- utilize the at least one trained entity relevancy machine learning model to predict the degree of relevance of each entity associated with the plurality of historical electronic activity data entries in the activity history based at least in part on the at least one travel plan, the plurality of model parameters and the plurality of activity attributes of each electronic activity data entry.

14. The system of claim 11, wherein the at least one processor is further configured to execute the software instructions that cause the at least one processor to perform steps to:
- receive at least one feedback from the user device;
  - wherein the at least one feedback comprises at least one indication of use of at least one used entity data record in the cache; and
- train the at least one trained entity relevancy machine learning model based at least in part on the at least one feedback.

15. The system of claim 11, wherein the at least one pre-cached entity data record comprises entity identification data for communications received from at least one entity associated with the at least one entity data record by a communication application on the user device.

16. The system of claim 15, wherein the communication application comprises a telephone application and the entity identification data comprises caller identification information.

17. The system of claim 11, wherein the at least one processor is further configured to execute the software instructions that cause the at least one processor to perform steps to:
- determine at least one pre-cached non-relevant entity based at least in part on the set of relevant entities and the at least one pre-cached entity;
- generate at least one entity data record removal instruction configured to cause the user device to remove the at least one pre-cached non-relevant entity; and
- instruct, with the at least one entity data record removal instruction, by the at least one processor, the user device to remove the at least one pre-cached non-relevant entity from the cache.

18. The system of claim 11, wherein the at least one processor is further configured to execute the software instructions that cause the at least one processor to perform steps to:
- generate at least one entity data record cache instruction configured to cause the user device to store the at least one un-cached relevant entity; and
- instruct, with the at least one entity data record cache instruction, the user device to update the cache by adding the at least one un-cached relevant entity to the cache.

19. The system of claim 11, wherein the at least one trained entity relevancy machine learning model comprises a classification layer configured to output at least one probability value representative of at least one probability of relevance.

20. The system of claim 11, wherein the plurality of historical electronic activity data entries comprise a plurality of historical transactions.

* * * * *